Jan. 6, 1942. J. S. COWL 2,268,803
FRUIT INSPECTION CONVEYER
Filed Feb. 19, 1941 2 Sheets-Sheet 1
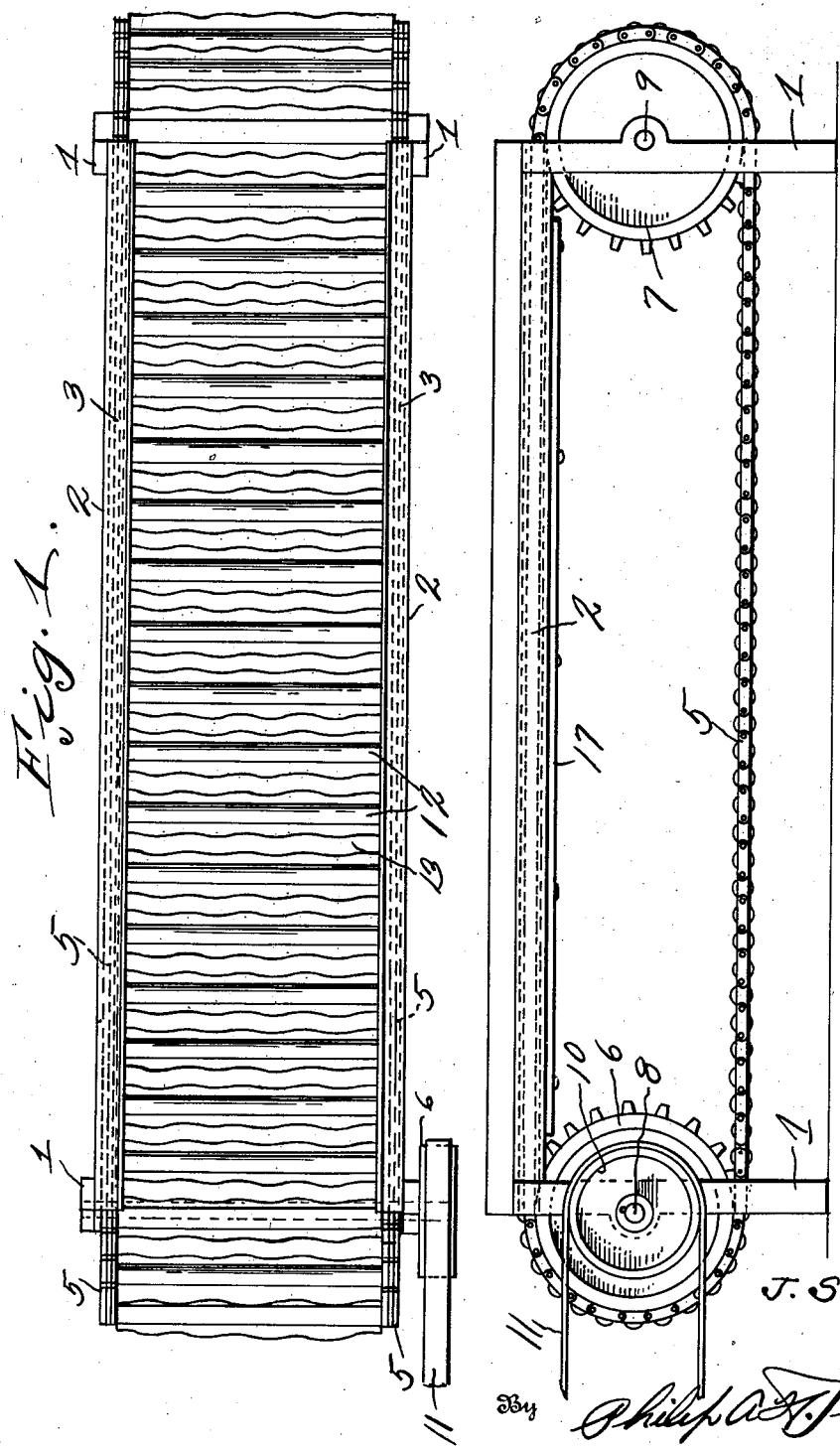
Inventor
J. S. Cowl Jan. 6, 1942.                J. S. COWL                2,268,803
                     FRUIT INSPECTION CONVEYER
                     Filed Feb. 19, 1941        2 Sheets-Sheet 2
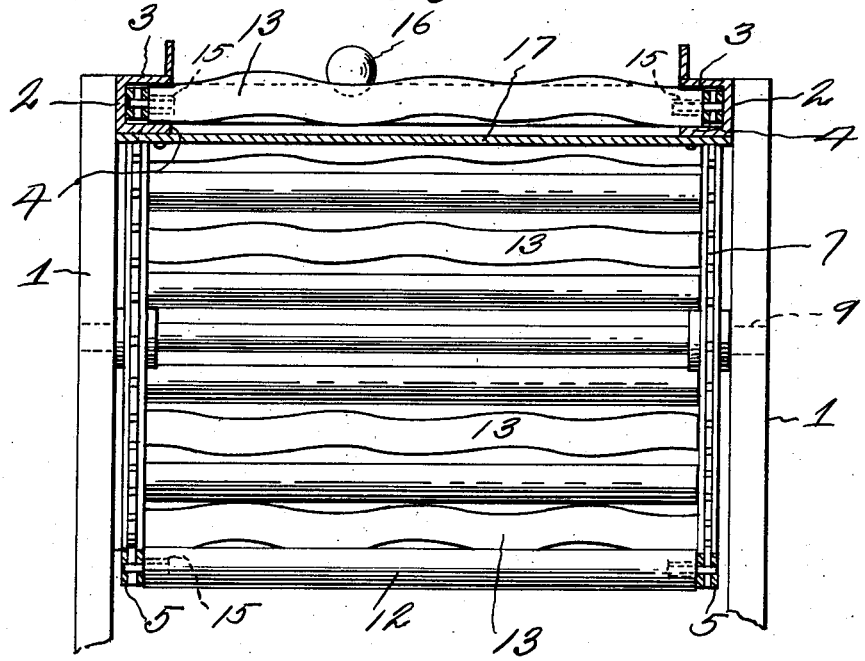
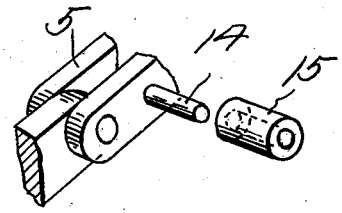
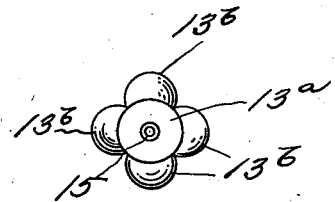
Inventor
J. S. Cowl
By Philip A. H. Purell
Attorney Patented Jan. 6, 1942

2,268,803

UNITED STATES PATENT OFFICE 2,268,803

FRUIT INSPECTION CONVEYER

John S. Cowl, Swoope, Va.

Application February 19, 1941, Serial No. 379,674

4 Claims. (Cl. 198—183)

The invention relates to fruit inspection tables, and has for its object to provide a device of this kind comprising a traveling belt having alternate straight and reverse bend rollers which are rotated as the belt progresses, thereby advancing the fruit and simultaneously rotating the fruit transversely and longitudinally of the belt for inspection purposes.

A further object is to provide a fruit inspection table comprising an endless belt formed from a plurality of alternate straight and reverse bend rollers adapted to cooperate with fruit for transversely rotating the fruit and transversely moving the fruit lengthwise of the rollers, and at the same time causing the fruit to rotate longitudinally of the conveyer incident to the rotation of the straight rollers.

A further object is to pivotally connect the ends of the rollers to endless sprockets extending through channeled members of the frame and to utilize the channelled members for rotating the rollers as the top flight of endless conveyer moves through the channeled members.

A further object is to provide a member beneath the top flight of the conveyer preferably of the same color as the rollers for reducing eye strain on operators, incident to the rapid rotation of the rollers during the operation of the device.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the assorting table.

Figure 2 is a side elevation of the table.

Figure 3 is a vertical transverse sectional view through the table.

Figure 4 is a detail perspective view showing the connection between the roller ends and the endless sprocket chains.

Figure 5 is an end view of a modified form of roller, showing a plurality of reverse bend members thereon.

Referring to the drawings, the numeral 1 designates the uprights of the frame of the machine, and which uprights are connected together by means of channels 2, having their flanges 3 and 4 inwardly disposed to form guides for the endless sprocket chains 5. The sprocket chains 5 extend over sprockets 6 and 7, which are in turn carried by transverse shafts 8 and 9. One of the shafts, preferably the shaft 8 is provided with a drive pulley 10, over which a belt 11 extends. The belt may lead to any suitable source of power.

The sprocket chains 5 are connected together by transversely disposed straight and reverse bend rollers 12 and 13. These rollers are rotated in the same direction, that is in the top flight, and the rollers 12 rotate the fruit in a direction transversely of the rollers, and at the same time the bends in the rollers 13 cause the fruit to rotate or roll sideways, therefore it will be seen that all surfaces of the fruit will be exposed to the operator and the specked or imperfect fruit will be picked from the table, and the perfect fruit discharged from the end of the machine into any suitable receptacle, or onto a packing table.

The ends of the rollers 12 and 13 are slightly smaller than the distances between the flanges 3 and 4 of the channel, and they rest and roll on the bottom flange 4. Therefore it will be seen that a uniform rotation of the fruit is obtained as it is advanced by the endless belt. Links of the sprocket chains 5 are provided with inwardly extending pins 14, which extend into bearing sleeves 15 in the ends of the rollers. These sleeves take up the wear and allow the use of wooden rollers for frictional engagement with the channel flanges 4, thereby insuring a positive rotation of the rollers. It will be noted that the bends in the rollers 13 are in the same plane, and the rollers, as they rotate, will cause the piece of fruit 16, referring to Figure 3, to oscillate backwards and forwards transversely as the fruit is engaged by high or low sides of the reverse bend rollers. Therefore all surfaces of the fruit are exposed to view and at the same time the rollers 12 will cause the fruit to rotate in a direction at substantially a right angle to the oscillating movement above set forth.

In inspection tables, it has been found that the rapid rotation of the rollers, particularly the curved ones, causes a strain on the eyes of the operator, and to overcome this objection a sheet of material 17 is placed below the rollers, and this sheet of material is of a color corresponding to the color of the rollers. Consequently the contours of the rollers are not clearly defined and strain on the eyes is relieved.

From the above it will be seen that an inspection table is provided which is simple in construction and one wherein the fruit is transversely rotated and longitudinally rotated at the same time the fruit is advanced over the table.

Referring to Figure 5 wherein a modified form of roller is shown, the roller is provided with a plurality of reverse bend members 13b extending longitudinally thereof. Four such reverse bend structures are shown on the roller 13a. However it is to be understood any number may be used if desired. The function of the conveyer is to rotate fruit as it is advanced in front of inspectors and to rotate said fruit in all directions transversely of the conveyer and longitudinally of the conveyer so that all surfaces will be exposed to view and defective fruit culled from the perfect fruit. By providing alternate straight and reverse bend rollers having their bends in the same plane the fruit will not only be rotated but will be forced to roll from side to side incident to the inclined surfaces of the bends of the rollers, and during this operation the rotating straight rollers will rotate the fruit during the side to side movement thereof.

The invention having been set forth what is claimed as new and useful is:

1. An inspection table comprising a frame, a conveyer passing through said frame, said conveyer comprising a plurality of straight rolls and a plurality of rolls having reverse bends therein in the same plane, means for rotating said rolls, said reverse bend rolls and straight rolls being in alternate relation.

2. A device as set forth in claim 1 including a light excluding member beneath the rolls.

3. A device as set forth in claim 1 including a light excluding member beneath the rolls, said rolls and light excluding member being of the same color.

4. A device as set forth in claim 1 including conveyer chains at the ends of the rolls and bearing pins carried by the chains and extending into bearings in the ends of the rolls.

JOHN S. COWL.